United States Patent [19]

Kosarski

[11] Patent Number: 5,456,525
[45] Date of Patent: Oct. 10, 1995

[54] VALVE FOR TRACTION CONTROL

[75] Inventor: Raymond Kosarski, Jr., Niles, Mich.

[73] Assignee: Allied Signal Inc., Morristown, N.J.

[21] Appl. No.: 232,912

[22] Filed: Apr. 25, 1994

[51] Int. Cl.$^6$ ............................................. B60T 8/32
[52] U.S. Cl. ..................... 303/113.2; 60/588; 188/358;
303/116.1; 303/119.1
[58] Field of Search ........................ 303/113.2, 113.3,
303/113.1, 900, 901, 119.1, 114.1, 114.2,
115.1, 116.1, 116.2, 116.4, 84.1, 84.2, 10–12;
60/588, 591, 561, 562, 592, 574, 575, 578;
188/358, 359, 352, 345, 347, 351

[56] References Cited

U.S. PATENT DOCUMENTS

| | | | |
|---|---|---|---|
| 4,415,210 | 11/1983 | Belart et al. | 303/114.1 |
| 4,498,299 | 2/1985 | Brademeyer | 60/588 X |
| 4,702,530 | 10/1987 | Belart et al. | 188/359 X |
| 4,807,942 | 2/1989 | Belart | 303/114.1 |
| 4,826,258 | 5/1989 | Ocvirk et al. | 303/113.3 |
| 4,828,333 | 5/1989 | Reinartz et al. | 303/100 |
| 4,867,509 | 9/1989 | Maehara et al. | 303/113.3 X |
| 4,902,077 | 2/1990 | Belart et al. | 303/113.1 |
| 4,944,565 | 7/1990 | Gilbert | 303/113.2 |
| 5,233,835 | 8/1993 | Gawlick | 60/578 |

FOREIGN PATENT DOCUMENTS

| | | | |
|---|---|---|---|
| 727299 | 10/1942 | Germany | 60/588 |
| 819789 | 7/1949 | Germany | 60/588 |
| 4125843 | 2/1993 | Germany | 303/113.1 |
| 4138930 | 6/1993 | Germany | 303/116.1 |
| 9206873 | 4/1992 | WIPO | 303/116.1 |

*Primary Examiner*—Douglas C. Butler
*Attorney, Agent, or Firm*—Leo H. McCormick, Jr.; Larry J. Palguta

[57] ABSTRACT

A master cylinder for use in a brake system having an anti-spin apparatus to provide traction control for the drive wheels of a vehicle. The brake system has a pump responsive to an input from the anti-spin apparatus for directly drawing fluid from a reservoir into the brake system through a separate valve located in a pump compensation port connected to a pressurizing chamber of the master cylinder.

4 Claims, 1 Drawing Sheet

VALVE FOR TRACTION CONTROL

This invention relates to master cylinder for use in a brake system having a valve which only allows fluid to be communicated from a reservoir to the system in response to a demand from a pump to selectively supply wheel brakes with pressurized fluid to effect a brake application and initiate traction control.

BACKGROUND OF THE INVENTION

The addition of anti-lock circuits to brake systems introduced a need to maintain a substantially constant quantity of fluid in a system even though when the anti-lock circuit functions in a build and decay function. The introduction of accumulators and/or pumps as disclosed in U.S. Pat. Nos. 4,598,955, 4,944,565 and 5,120,115 to the brake system which are controlled by various solenoid valves provide supplementary fluid during an anti-lock function have proven acceptable for most brake systems. To improve the operation and control of a vehicle, an anti-spin function has been added which utilizes some of the same components of an anti-lock system to limit the rotation differential between drive wheels of a vehicle. In such anti-spin systems, a pump supplies a controller with pressurized fluid which is selectively supplied to effect braking of the faster rotating drive wheel and bring it into synchronization with another drive wheel. The pump draws fluid from the master cylinder reservoir through the compensation port associated with a pressurizing chamber. Under some circumstances, the size of the compensation port could restrict the development of pressurized fluid to effect the anti-spin function effectively and when center port compensation occurs, the flow of fluid through the compensation port could reduce the effective functional life cycle of the components.

SUMMARY OF THE INVENTION

In the present invention, a separate and independent compensation port has been provided for the exclusive use with a pump to provide fluid to the brake system. The master cylinder has a housing with a bore therein having first, second and third compensation ports and first and second fill ports connected to a reservoir and first and second outlet ports connected to the brake system. First and second pistons are located in the bore to define first and second pressurizing chambers in the housing. The first and second pistons are urged toward a rest position by resilient means to permit free communication between the first and second pressurizing chambers and reservoir through the first and second compensation ports. Movement of the first and second pistons with respect to the first and second compensation ports causes fluid to be pressurize in the first and second chambers which is supplied to the brake system through the first and second outlet ports to effect a brake application. A valve located in the housing and connected to the third compensation port prevents the pressurized fluid from being communicated to the reservoir during such a brake application. During an anti-spin function, the valve associated with the third compensation port responds to a demand from the pump and moves to allow fluid to be directly communicated into the brake system by flowing through the third compensation port, first pressurizing chamber and first outlet port.

An advantage of the present invention offers resides in a compensation port in a master cylinder can be sized for and dedicated for exclusive use of a pump in a brake system.

An object of this invention is to provide a brake system with a master cylinder having an independent compensation port with a valve therein that responds to a demand of a pump through which fluid is provided to a system during anti-spin function of a brake system.

One way of carrying out the invention is described in detail below with reference to the drawings which illustrate such a master cylinder.

DETAILED DESCRIPTION OF THE INVENTION

Figure 1:
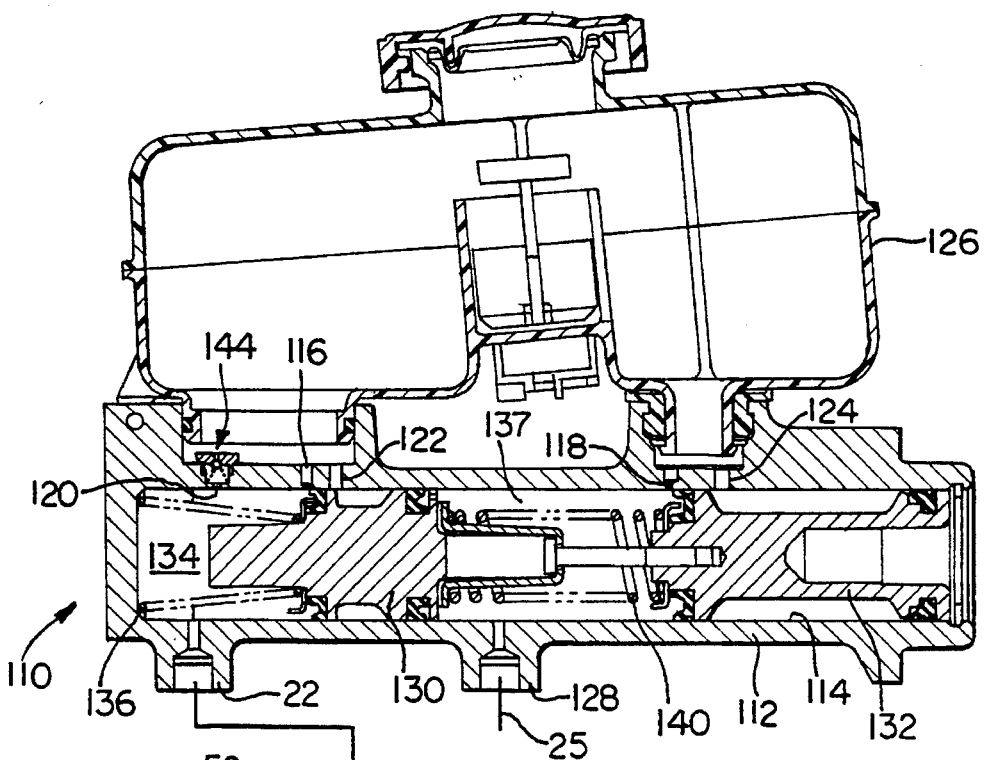
FIG. 1 is a schematic illustration of a brake system with a master cylinder made according to the principals of the present invention.

The brake system 110 shown in FIG. 1 has a master cylinder 12 which is connected by branches 26a and 26b of conduit 26 to wheel cylinders (only 10 being shown) of drive wheels and by conduit 25 to the other wheels cylinders (not shown) of the vehicle. The master cylinder 12 is designed to receive and input from an actuation member such as a brake booster responsive to an force applied to a brake pedal to effect a brake application.

Anti-lock apparatus are associated with all the wheels of the vehicle while the anti-spin apparatus are only associated with the drive wheel of the vehicle. In order to describe the invention contained herein only so much of the anti-lock and anti-spin apparatus as are necessary to describe the function of valve 166 located in the master cylinder 12 will be described in detail as this structure is known in the prior art and in particular U.S. Pat. No. 4,944,565. The anti-lock and anti-spin apparatus connected to conduit 26 includes solenoid valves 34, one of which is located in branch 26a and the other (not shown) in branch 26b, each of which has an inlet port a, an outlet port b and a relief port c. Inlet port a is connected to the outlet port 22 of master cylinder 12 while the outlet port b is connected to the brake cylinder 10 in a drive wheel. As shown in FIG. 1, solenoid 34 is not energized such that relief port c is isolated from branch 26a; and direct and unimpeded fluid communication occurs between outlet port 22 of the master cylinder 12 and the wheel cylinder 10. When solenoid 34 is activated as during an anti-lock function, inlet port a is isolated and outlet port b is now connected to relief port c which connected to low pressure accumulator 36 by conduit 38 and an electric pump 40 in conduit 42. The suction port for pump 40 is designed to communicate with accumulator 36, relief port c, and anti-slip valve 48 while the delivery port of pump 40 is connected to conduit 26 upstream of the branches 26a and 26b. A check valve 43 located in conduit 42 prevents communication of pressurized fluid toward pump 40. During operation of the anti-lock apparatus, pump 40 and solenoid valve 34 are actuated to allow fluid to be communicated from the wheel cylinders (only 10 is shown in FIG. 1 ). During situations where brake pressure is increasing, solenoid 34 is deenergized and pump 40 delivers pressurized fluid into conduit 26 for distribution to the individual wheel brakes.

The anti-slip apparatus uses the computer and wheel sensor devices of the anti-lock apparatus and functions to prevent differential spin between the drive wheels of the vehicle. Solenoid valve 48 connected to conduit 26 and actuated by an input from the computer or controller of the anti-lock apparatus provides for operational control of the vehicle. Solenoid valve 48 has an inlet port d connected to outlet port 22 of the master cylinder 12 and an outlet port e connected to inlet ports a of valves 34 located in branches 26 and 26b and a second outlet port f connected to suction port of pump 40 by way of conduit 50. When anti-lock apparatus is in operation, valve 48 is not energized outlet port f is isolated while inlet port d directly communicates to outlet port e such that fluid from the outlet port of the master cylinder 12 is freely communicated to both branches 26a and 26b with outlet port f isolated.

During an anti-spin function, pump 40 and solenoid valve 48 are actuated to isolate outlet port e and open communication between ports d and f such that the suction port of pump 40 is in communication with outlet port 22 of master cylinder 12 and accumulator 36. In this situation, fluid is drawn from the reservoir of the master cylinder 12 since the volume of fluid in accumulator 36 is not sufficient to independently effect a brake application. The operation of relief valves 34 located in branches 26a and 26b is controlled by the computer such that braking only occurs in the faster spinning drive wheel. In order for the demand of fluid to be met for the pump 40, fluid must be able to be rapidly communicated from the reservoir of master cylinder 12.

The master cylinder 12 shown in FIG. 1 has a housing 112 having a bore 114 therein connected to a reservoir 126 through first 116, second 118 and third 120 compensation ports and first 122 and second 124 fill ports. and connected to a brake system 110 through a first 22 port connected to conduit 26 and a second 128 outlet port connected to conduit 25. First 130 and second 132 pistons are located in bore 114 and separated from each other by spring 140 and from the bottom of bore 114 by return spring 136 to define first 134 and second 137 pressurizing chambers in housing 112. The first 130 and second 132 pistons are urged toward a rest position or stop 142 by return spring 136 to permit free communication between the first 134 and second 137 pressurizing chambers of the reservoir 126 through the first 116 and second 118 compensation ports.

Figure 2:
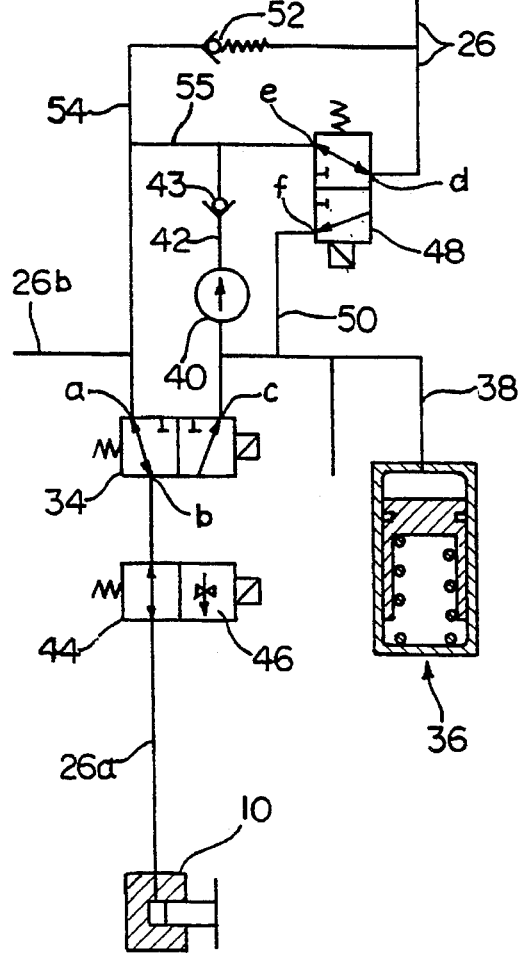
FIG. 2 is an enlarged sectional view of the pump compensation port and valve in the master cylinder of FIG. 1.
Figure 2:
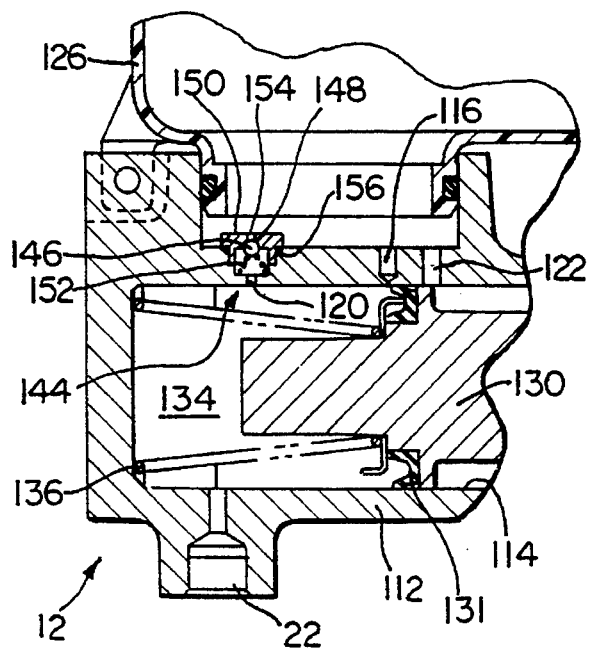

A pump sump valve 144 as best shown in FIG. 2 is located in compensation port 120 of housing 112. Valve 144 has a semi-spherical member or ball 146 which is urged toward a seat 148 in a retainer 150 by a spring 152. Retainer 150 has an opening 154, the size of which is approximately twice as large as the openings in compensations ports 116 and 118, to provide for fast communication of fluid to chamber 134 from reservoir 126. Retainer 150 which is screwed into or held be a snap ring in housing 112 compresses seal 156 to prevent the establishment of a leak path from chamber 134 to reservoir 126 during a brake application.

When solenoid valve 48 and pump 40 are energized and a demand for fluid is created ball 146 moves at the inlet of pump 40. This demand creates a suction force which moves ball 146 away from seat 148 to allow fluid from reservoir 126 to rapidly flow to a pump 40 by way of chamber 134, outlet port 22, conduit 26, valve 48, and conduit 50. Because of the size of opening 154, fluid rapidly flows from reservoir 126 into chamber 134 without turbulence and in essence very little fluid flows through compensation port 116 which would engage lip seal 131 on piston 130 and create wear or deterioration. The output of pump 40 is directed through check valve 43 and into conduit 26 for distribution to branches 26a and 26b. A spring limited check valve 52 located in conduit 26 assure that the output from pump is not communicated to the master cylinder 12. The pump 40 remains activated in accordance with the operational computer until the anti-spin function is completed.

On termination of the actuation of pump 40 and valve 48, communication from branches 26a and 26b is reestablished such that fluid is returned to reservoir 126 by flowing from branch conduit 54 through conduit 55 to outlet e of valve 48 to now opened inlet d to conduit 26.

Through this master cylinder 12, fluid is always available for use by the pump 40 without causing deterioration of seals associated with the piston.

I claim:

1. In a brake system having a master cylinder which communicates pressurized fluid to driving wheel brakes and non-driven wheel brakes of a vehicle to effect a brake application, an anti-lock apparatus for controlling the rotation of wheels during through selective actuation of said driving wheel brakes and non-driven wheel brakes during an anti-lock function of such brake application, an anti-spin apparatus for controlling the rotation of driving wheels through said driving wheel brakes in response to an anti-spin function during acceleration of the vehicle, a pump responsive to said anti-lock apparatus and anti-spin apparatus for maintaining the fluid pressure of said pressurized fluid supplied to said driving wheel brakes and non-driven wheel brakes during such brake application, first solenoid valve means having a first inlet port connected to said master cylinder, a first outlet port connected to said driving wheel brakes of the vehicle and a relief port connected to a storage container in said brake system, said first solenoid valve means being activated during such brake application, and second solenoid valve means having a second inlet port connected to said master cylinder, a second outlet port connected to said first inlet port of said first solenoid valve means and a third outlet port connected to said pump, said second solenoid valve means being activated during said anti-spin function to switch communication between said second inlet port and second outlet port to said third outlet port, said master cylinder comprising:

a housing having a bore therein with first, second and third compensation ports connected to a reservoir, a first supply port and a second supply port;

first and second pistons located in said bore to define first and second pressurizing chambers in said housing, said first and second pistons being urged toward a rest position by resilient means to permit free communication between said first and second pressurizing chambers and said reservoir through said first and second compensation ports, said first pressurizing chamber being connected to said driving wheel brakes through said first supply port, said first inlet port of said first solenoid valve means and said second inlet port of said second solenoid valve means and said second pressurizing chamber being connected to said non-driving wheel brakes through said second supply port;

means for moving said first and second pistons and first and second seals located on the first and second pistons, respectively with respect to said first and second compensation ports to pressurize fluid in said first and second pressurizing chambers and supply said driving wheel brakes and non-driven wheel brakes with pressurized fluid to effect a brake application; and pump sump valve means located in said housing and connected to said third compensation port to prevent pressurized fluid from being communicated to said reservoir during a brake application, said pump sump valve means allowing fluid to be directly communicated to said pump by flowing through said third compensation port, said first pressurizing chamber, said first supply port, said second inlet port, and said third outlet port in response to a demand received from said pump.

2. In the brake system as recited in claim 1 wherein said pump sump valve means includes:

a retainer member secured to said housing, said retainer member having a central opening through which said reservoir is connected to said third compensation port;

a spherical member located in said third compensation port; and a spring for urging said spherical member toward a seat that surrounds said central opening in said retainer member to prevent the flow of fluid from said reservoir to said first chamber in the absence of a request from said pump.

3. In the brake system as recited in claim 2 wherein said pump sump valve means further includes:

a seal located between said retainer member and housing to prevent communication of pressurized fluid from said first pressurizing chamber toward said reservoir.

4. In the brake system as recited in claim 3 wherein the flow of fluid from said reservoir through said third compensation port only occurs as a function of a demand from said pump.

\* \* \* \* \*